Patented Jan. 31, 1933

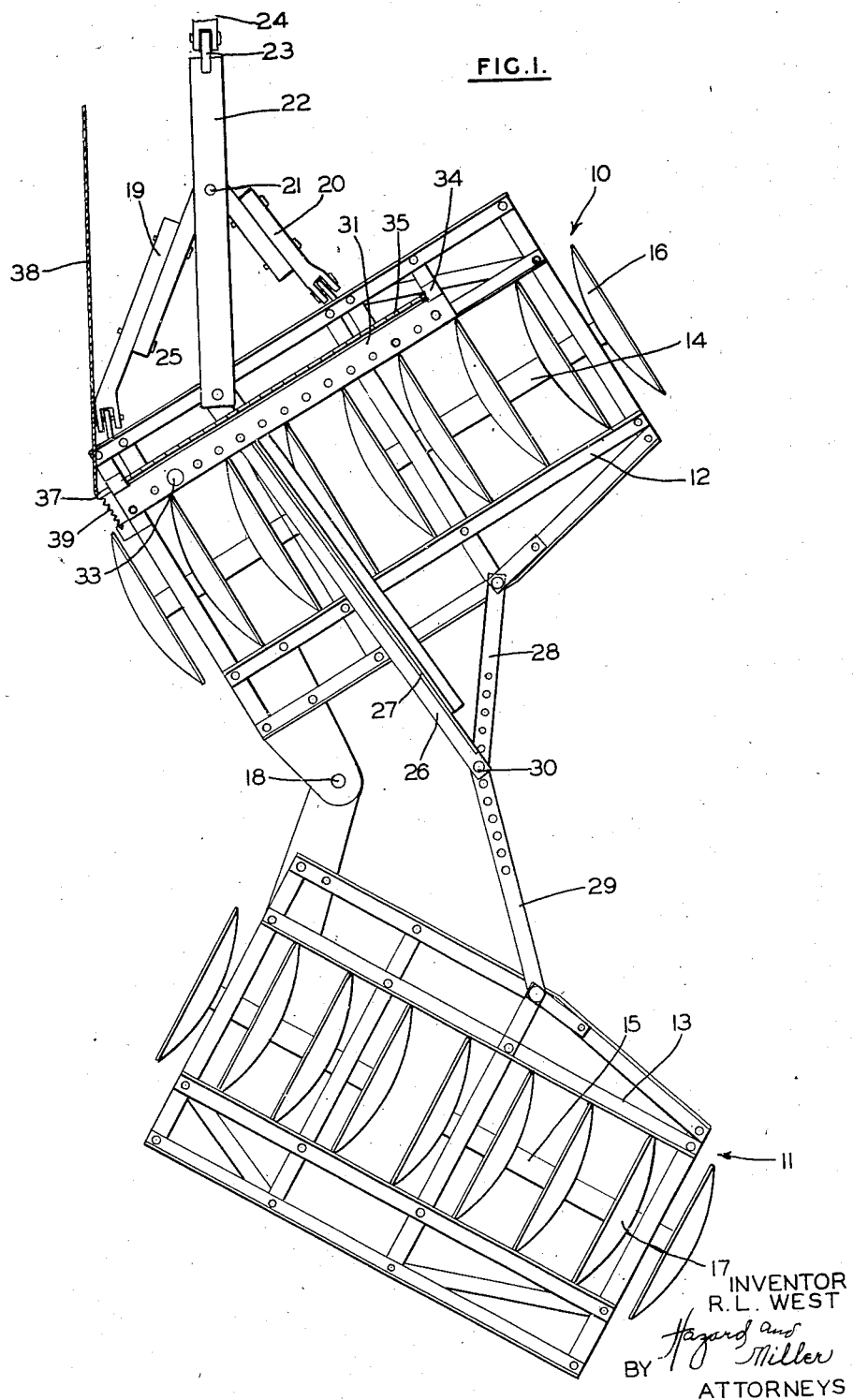

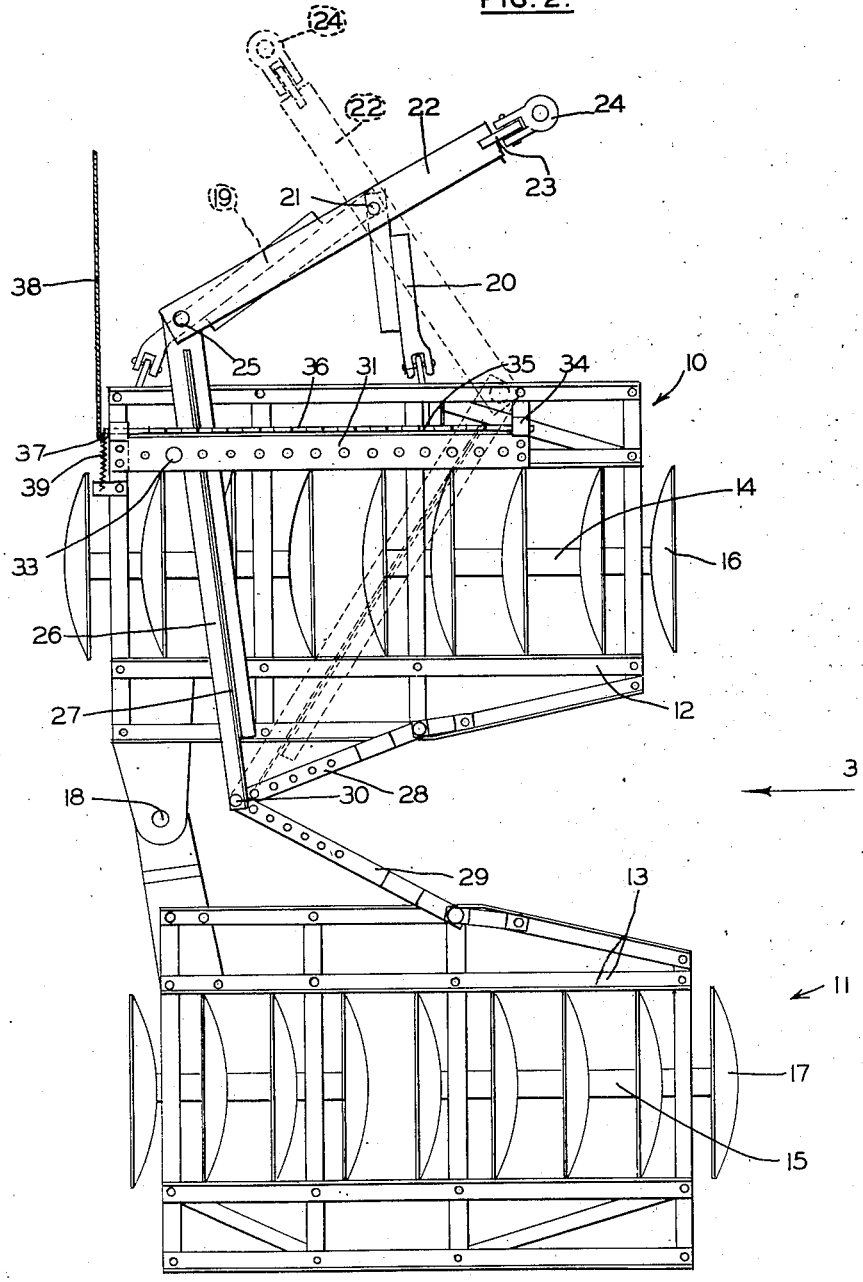

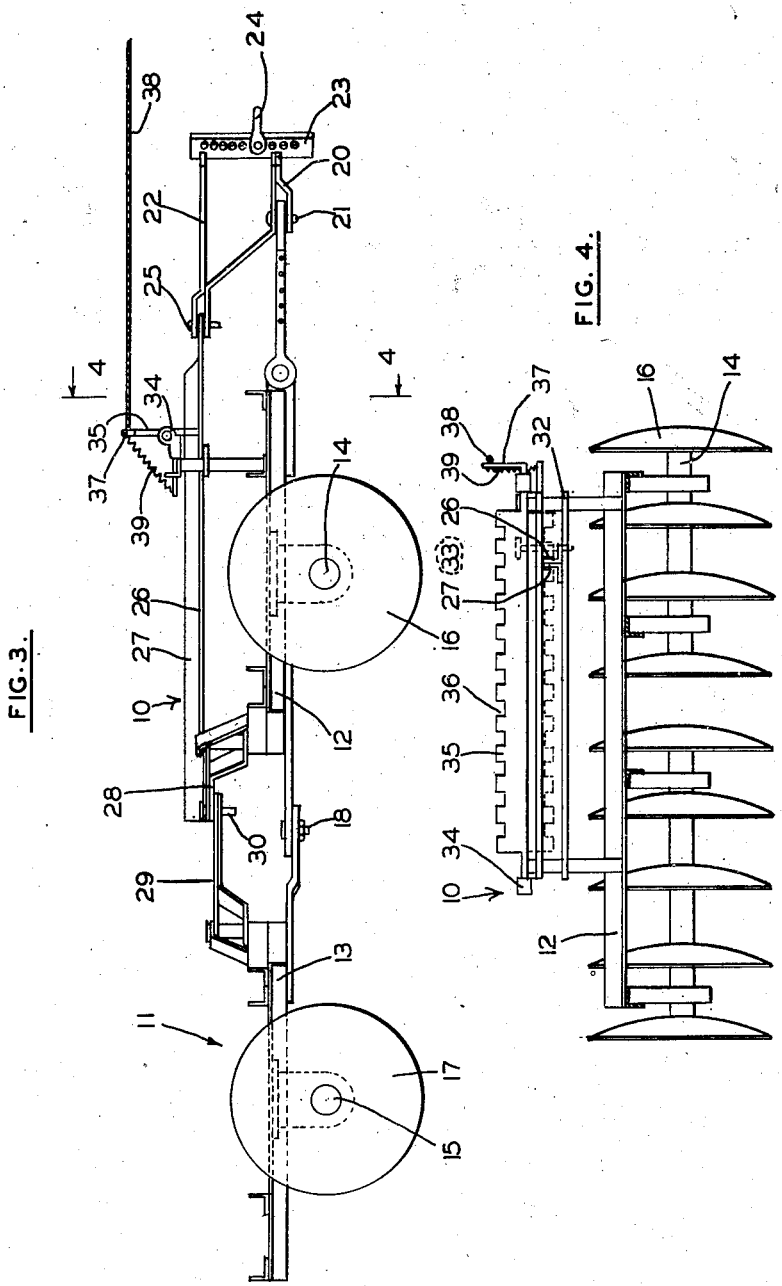

1,895,831

UNITED STATES PATENT OFFICE

RAYMOND L. WEST, OF SANTA ANA, CALIFORNIA

HITCH FOR OFFSET TANDEM DISK HARROWS AND THE LIKE

Application filed March 19, 1930. Serial No. 437,075.

This invention relates to a hitch for offset tandem disk harrows and the like.

Offset tandem disk harrows are now in general use which consist generally of a forward harrow and a rear harrow. These harrows are connected together by a movable construction permitting the harrows to assume positions in angular relation with respect to each other or positions approximately parallel. In such offset tandem disk harrows difficulty has been experienced in making a turn. The harrow is frequently towed by a tractor and many present tractor constructions are such that when the tractor is making a turn the effective pulling power is greatly reduced. In the conventional offset tandem disk harrow the arrangement of the harrows is such that no great resistance is effected by the harrow in making a left turn. However, if a right turn is attempted the arrangement of the harrows is such that the harrow creates an added resistance. This added resistance plus the decreased effective pulling power exerted by the tractor is sometimes sufficiently great to cause the tractor to stall.

It is an object of this invention to provide an improved tandem disk harrow construction which is so constructed that on making a turn the sections of the harrow will ordinarily move into positions which will cause the harrow construction to afford the minimum amount of resistance. While the improved construction is primarily designed to enable the towing vehicle to make a right hand turn, which was heretofore quite difficult, it incidentally brings about the same movement of parts in making a left hand turn.

Another object of the invention is to provide an offset tandem disk harrow construction having a forward harrow, a rear harrow movably connected thereto, and a pivoted draw bar which, on being swung laterally, will swing the rear harrow from its offset or angular position into a parallel position.

The improved construction also contemplates locking the forward and rear harrows in various positions which will facilitate towing the harrow from one locality to another.

With the foregoing and other objects in view, which will be made manifest in the following detailed description, and specifically pointed out in the appended claims, reference is had to the accompanying drawings for an illustrative embodiment of the invention, wherein:

Fig. 1 is a top plan view of the improved offset tandem disk harrow, showing the harrow in its normal position.

Fig. 2 is a view similar to Fig. 1, illustrating the harrow in the position assumed on making a right hand turn and indicating in dotted lines the position assumed on making a left hand turn.

Fig. 3 is a side elevation taken in the direction of the arrow 3 upon Fig. 2.

Fig. 4 is a sectional view taken substantially upon the line 4—4 upon Fig. 3.

Referring to the accompanying drawings, wherein similar reference characters designate similar parts throughout, the improved construction consists of a forward harrow generally designated at 10 and a rear harrow generally designated at 11. The details of construction of the two harrows may vary under different circumstances and may be regarded as somewhat immaterial insofar as the present invention is concerned. As shown upon the drawings, each harrow comprises a general frame, the frames being indicated at 12 and 13 respectively, and each harrow is provided with axles 14 and 15 on which the disks 16 and 17 are mounted. The frames of the harrows are movably connected together as by a pintle 18 so that the forward harrow and rearward harrow may assume positions angular with respect to each other, as shown on Figure 1, or may assume a position approximately parallel with each other as shown upon Figure 2. On the forward harrow there is mounted a hitch, the hitch being formed of two forwardly extending bars 19 and 20 which are preferably adjustable as to length. At their forward ends these bars are connected by a pin 21 which provides a pivot for a draw bar 22. By having the bars 19 and 20 of the hitch adjustable as to length, a transverse adjustment of the position of pivot pin 21 is possible. In other words the relationship between pivot 21 and the sides of the forward harrow can be varied. To have an adjustment at this point is important inasmuch as tandem disk harrows of this general character have a tendency to assume certain positions with respect to each other and to the tractor depending upon the nature of the soil being cultivated. By adjusting the position of pivot pin 21 and thus adjusting the line of tow, it is possible to cause the two harrows to assume proper normal positions to cultivate a given type of soil in the desired manner. As clearly shown upon Figures 1 and 2, the draw bar is pivoted on the pin 21 intermediate its ends and preferably at a point near the center. The forward end of the draw bar is provided with a vertical perforated bar 23 and a clevis 24 may be adjustably mounted on this perforated bar, providing for attachment to a towing vehicle such as a tractor. As clearly shown in Figure 3, the rear end of draw bar 22 is located at a point above the tops of the disks 16 and at its rear end it is pivotally connected as by a pin 25 to the forward end of an actuating link 26. The actuating link is preferably made up of two angle irons fastened together with a side of each angle iron arranged side by side, thus forming an upstanding web indicated at 27 which extends longitudinally of the actuating link for a purpose hereinafter to be described. The rear end of the actuating link is pivotally connected to two connecting links 28 and 29. These connecting links are preferably provided with a series of apertures so that the position of the pivot 30 may be varied thereon. The forward link 28 connects the rear end of the actuating link 26 to the frame of the forward harrow while the rear connecting link connects the actuating link with the frame of the rear harrow.

The operation of the above described construction is as follows. In using the improved offset tandem disk harrow, the device is towed, such as by a tractor, and in the ordinary towing position the draw bar 22 will be positioned as shown in Figure 1. In this position the actuating link and the connecting links are in such positions that the harrows will be in offset or angular arrangement, as shown in this figure. This is the normal position of the harrows in harrowing. When it is desired to make a turn to the right, however, the draw bar will be swung into a position approaching that illustrated in full lines upon Figure 2, depending upon how sharp a turn is being made. This swinging of the draw bar from the straight ahead position toward the right causes the actuating link 26 to be drawn forwardly and the connecting links 28 and 29 to transmit this forward movement of the actuating link to the rear harrow. The forward harrow is also drawn back so that both harrows approach the position shown in Figure 2. Ordinarily the harrows will be entirely closed together in the position shown in this figure but where no sharp turn is being made they will merely approach it. In this position wherein the disks of the two harrows are directed straight forward, the harrow will afford a minimum amount of resistance to its being towed. Consequently on making a right hand turn the resistance of the harrow is decreased sufficiently so that the tractor will not stall, although its effective pulling power in making a turn may be reduced as previously described. It will be noted that the outer or swinging ends of the two harrows have frames with beveled opposed surfaces. In making extremely sharp right hand turns it is sometimes desirable to have the harrows move toward each other beyond a parallel position, shown in Figure 2. This beveling of the opposed faces of the frames at their swinging ends allows the swinging ends to approach each other closer than a parallel position so that the angles of the two harrows 14 and 15 are on radii from a center about which the turn is being made.

As indicated in dotted lines on Figure 2, it incidentally occurs that if a left hand turn is made with the tractor, that the draw bar will swing into the dotted line position, moving the actuating link forwardly as shown in dotted lines and causing the harrow to close into a position which affords the minimum resistance to its being towed. This ability to cause the harrow to close on making a left hand turn as well as a right hand turn is due to the fact that the length of the draw bar 22 between pivot pin 21 and pivot connection 25 is less than the length of the actuating bar 26. By having these parts so proportioned, pivot pin 25 will swing across center, or will swing through the straight line joining pivot pin 21 and pivot pin 30. Consequently on swinging the draw bar to either right or left hand position the actuating bar will be moved in such a manner as to effect a closing movement of the two harrows. Consequently the improved construction is such that the resistance exerted by the harrow against forward movement is decreased on making either a right or a left hand turn. When the turn is completed and the draw bar is swung back into the position shown in Figure 1, the returning movement of the draw bar is transmitted through the actuating link 26 and the connecting links and furnishes the power required to forcibly open the harrow, or move the forward and rear harrows into the angular relationship shown in Figure 1.

On top of the frame of the forward harrow there are positioned upper and lower plates 31 and 32. These plates have aligned apertures formed therein adapted to receive one or more locking or limiting pins 33. As the actuating link 26 extends rearwardly between these upper and lower plates, the pins 33 may be positioned in any of the apertures and serve to limit the lateral movements of the actuating link. Forwardly of these plates bearings 34 are provided which pivotally support a locking bar 35, which has a plurality of recesses 36 formed on its upper edge, which recesses are capable of receiving the web 27 on the actuating link 26. On one end of this locking bar there is formed a crank 37 to which a rope or cable 38 may be connected and which may extend forwardly to the driver's seat on the tractor. A spring 39 is connected to the crank 37 and extends rearwardly therefrom and is under tension. This spring urges the crank into either of two positions, one in which the web 27 is disengaged and the other wherein the web is engaged and locked. By pulling the rope or cable 38 forwardly, swinging the crank 37 beyond center, the spring 39 becomes effective on passing the center or horizontal position to completely throw the crank into either of the mentioned positions. The locking bar thus may be caused to releasably lock the forward and rear harrows in any desired position, a mere pull on the cable serving to lock or unlock the actuating link, depending upon the position of the crank 37.

During normal operation it is not necessary to lock up either the actuating bar or the draw bar. During this normal operation the construction is quite automatic in that after the hitch has been properly adjusted to cause the harrow to function properly in a given soil, the harrow will properly track so as to effectively cut and till the soil. On making right or left hand turns the harrows will automatically close and in making an extremely sharp right hand turn the harrow will close beyond a parallel position, facilitating turning. In making extremely sharp left hand turns the rear portions or tracks of the tractor do not engage or lock against the draw bar. This automatic ability of the construction is highly advantageous and the arrangement of parts is such as to enable very sharp turns which is important in cultivating citrus groves and the like.

In towing the harrow from one locality to another it is highly desirable to lock the forward and rear harrows in the position shown in Figure 2 so that the disks will merely roll upon the surface. The harrow can be locked in this position either by positioning locking pins 33 against opposite sides of the actuating link or employing the locking bar 35. In such position the draw bar 22 will be locked in the position shown in Figure 2 and in this position the entire offset tandem disk harrow is towed by the tractor.

From the above described construction it will be appreciated that an improved hitch for offset tandem disk harrows is provided which causes the forward and rear harrows to assume positions wherein the harrow will exert the minimum amount of pulling resistance on making a right or left hand turn. Furthermore the improved construction enables the device to be locked in a position of minimum pulling effort or to be releasably held in such position by means which is operable from the towing vehicle.

Various changes may be made in the details of construction without departing from the spirit or scope of the invention as defined by the appended claims.

I claim:

1. A tandem disk harrow construction comprising a front harrow, a rear harrow pivoted thereto, a draw bar pivotally mounted upon the front harrow having attaching means providing for attachment to towing means, and an actuating bar pivotally connected to the draw bar and operatively connected to the rear harrow so as to effect an opening and closing of the harrows, the attaching means, point of pivot for the draw bar, and pivotal connection between the draw bar and actuating bar being arranged substantially upon the same straight line.

2. A tandem disk harrow construction comprising a front harrow, a rear harrow pivoted adjacent one end to a point adjacent the corresponding end of the front harrow, links pivotally connected to the front and rear harrows and to each other, a draw bar pivotally mounted intermediate its ends to the front harrow, and an actuating bar pivotally connected to the draw bar and one of the links, the length between the pivot mounting of the draw bar and its connection with the actuating bar being shorter than the length of the actuating bar whereby on turning the draw bar either to the right or to the left the actuating bar may be moved forwardly thereby to effect or allow approaching movement of the swinging ends of the harrows.

3. A tandem disk harrow construction comprising a front harrow, a rear harrow pivoted adjacent one end to a point adjacent the corresponding end of the front harrow, links pivotally connected to the front and rear harrows and to each other, a draw bar pivotally mounted intermediate its ends to the front harrow, an actuating bar pivotally connected to the draw bar and one of the links, and means providing for an adjustment of the pivot mounting for the draw bar transversely of the front harrow.

4. A tandem disk harrow comprising a front harrow, a rear harrow pivotally connected adjacent one end to the front harrow adjacent its corresponding end, a draw bar pivoted on the front harrow, means operable by turning the draw bar for causing or allowing the swinging ends of the harrow to approach each other, the opposed sides of the harrows being beveled adjacent the swinging ends enabling the swinging ends of the harrows to approach each other beyond parallel positions of the harrows.

In testimony whereof I have signed my name to this specification.

RAYMOND L. WEST.